United States Patent
Park et al.

(10) Patent No.: US 11,230,317 B2
(45) Date of Patent: Jan. 25, 2022

(54) ROTOR AND MOTOR INCLUDING SAME

(71) Applicant: LG INNOTEK CO., LTD., Seoul (KR)

(72) Inventors: Jae Hyun Park, Seoul (KR); Hee Soo Lim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 519 days.

(21) Appl. No.: 16/309,387

(22) PCT Filed: Jun. 13, 2017

(86) PCT No.: PCT/KR2017/006125
§ 371 (c)(1),
(2) Date: Dec. 12, 2018

(87) PCT Pub. No.: WO2017/217729
PCT Pub. Date: Dec. 21, 2017

(65) Prior Publication Data
US 2019/0315387 A1    Oct. 17, 2019

(30) Foreign Application Priority Data
Jun. 13, 2016    (KR) .......................... 10-2016-0073391

(51) Int. Cl.
*H02K 1/27*    (2006.01)
*H02K 1/28*    (2006.01)
*B62D 5/04*    (2006.01)

(52) U.S. Cl.
CPC .......... *B62D 5/0403* (2013.01); *H02K 1/278* (2013.01); *H02K 1/28* (2013.01)

(58) Field of Classification Search
CPC ........ B62D 5/0403; B62D 5/04; H02K 1/278; H02K 1/28
See application file for complete search history.

(56) References Cited

U.S. PATENT DOCUMENTS

2010/0102661 A1    4/2010    Kim et al.
2011/0314659 A1*  12/2011   Leachman ............... H02K 7/04
                                                           29/597

(Continued)

FOREIGN PATENT DOCUMENTS

CN    102832727 A    12/2012
CN    105359383 A    2/2016

(Continued)

OTHER PUBLICATIONS

Machine Translation, Yamamura, JP-2004129369-A, Apr. 2004. (Year: 2004).*

*Primary Examiner* — Thomas Truong
(74) *Attorney, Agent, or Firm* — Birch, Stewart, Kolasch & Birch, LLP

(57) ABSTRACT

The present invention provides a rotor comprising: a rotor core; a cover arranged on an upper part of the rotor core; a magnet arranged on the outer circumferential surface of the rotor core; and a can member accommodating the rotor core and the magnet and coupled to the cover, wherein the cover includes a plurality of downwardly extending guides, the guides are arranged on the outer circumferential surface of the rotor core and are arranged inside the can member, and the can member includes at least one protrusion part protruding from a border thereof so as to be coupled to the cover. Therefore, the present invention provides an advantageous effect of excluding the use of an adhesive in the coupling of a can to a rotor core.

20 Claims, 12 Drawing Sheets

(56) References Cited

U.S. PATENT DOCUMENTS

2013/0057102 A1  3/2013  Yamada et al.
2016/0126793 A1  5/2016  Kawasaki et al.

FOREIGN PATENT DOCUMENTS

| DE | 403 880 C | | 10/1924 |
|---|---|---|---|
| JP | 2-303339 A | | 12/1990 |
| JP | 2003-37954 A | | 2/2003 |
| JP | 2004129369 A | * | 4/2004 |
| JP | 2004-153980 A | | 5/2004 |
| JP | 4516392 B2 | | 8/2010 |
| JP | 2013-118799 A | | 6/2013 |
| KR | 10-2004-0051676 A | | 6/2004 |

* cited by examiner

ROTOR AND MOTOR INCLUDING SAME

CROSS REFERENCE TO RELATED APPLICATIONS

This application is the National Phase of PCT International Application No. PCT/KR2017/006125, filed on Jun. 13, 2017, which claims priority under 35 U.S.C. 119(a) to Patent Application No. 10-2016-0073391, filed in the Republic of Korea on Jun. 13, 2016, all of which are hereby expressly incorporated by reference into the present application.

TECHNICAL FIELD

Embodiments relate to a rotor and a motor including the same.

BACKGROUND ART

An electric power steering (EPS) system is an apparatus capable of allowing a driver to safely drive a vehicle by securing circling stability of the vehicle and providing a quick restoring force. The EPS system controls driving of a steering shaft of the vehicle by driving a motor through an electronic control unit (ECU) according to driving conditions sensed by a vehicle speed sensor, a torque angle sensor, a torque sensor, and the like.

A rotor of the motor of the EPS system may include a magnet. The magnet may be attached to an outer circumferential surface of a rotor core. In the case of the motor, due to structural properties, a variety of types of protectors (molding, can, tube, and the like) are applied to improve durability of assembled magnets.

Among them, a can type is the most commonly applied method and protects the rotor and prevents separation of the magnets by combining cup-shaped cans with a top and a bottom of an outer circumferential surface of the rotor.

However, in order to assemble the rotor inside the can, an adhesive is applied to an inside of the can. However, a process of applying the adhesive has a problem of complicating a process of assembling the rotor. Particularly, there is a problem that uniformly applying a fixed quantity of the adhesive to a bonding part between the can and the rotor is very complicated.

Also, two cans are used such that the number of components increases and manufacturing costs increase.

DISCLOSURE

Technical Problem

The present invention is directed to providing a rotor capable of excluding use of an adhesive and reducing the number of cans and a motor including the same.

Aspects of the embodiment are not limited to the above-stated aspect, and unstated other aspects can be clearly understood by those skilled in the art from the following description.

Technical Solution

One aspect of the present invention provides a rotor including a rotor core, a cover disposed above the rotor core, a magnet disposed on an outer circumferential surface of the rotor core, and a can member which accommodates the rotor core and the magnet and is combined with the cover. Here, the can member includes at least one protrusion portion which protrudes from an edge and is combined with the cover.

The can member may include a cylindrical body which surrounds the magnet, and the protrusion portion may be formed on any one side of the body.

The rotor may include a flange portion which is formed on the other side of the body and internally faces a center of the can member.

The protrusion portion may be located in a center of the magnet on the basis of a circumferential direction of the rotor core.

The number of such protrusion portions may be equal to the number of the magnets.

The cover may include a cover body including an annular inner portion and an outer portion formed outside the inner portion, and the outer portion may be formed to be higher than the inner portion on the basis of an axial direction of the rotor core.

The protrusion portion may be combined with the outer portion.

The outer portion may include an inclined surface formed to be inclined toward a center of the rotor core.

The outer portion may include an engaging groove portion which is formed to be concave and with which the protrusion portion is combined.

The cover may include a stopper including a protruding column portion and a fixing portion extending from the column portion, and the fixing portion may be disposed above the protrusion portion combined with the cover in a radial direction from a center of the rotor core.

The column portion may protrude from a top surface of the inner portion, and a fore end of the fixing portion may be located farther out than a fore end of the protrusion portion combined with the cover in the radial direction from the center of the rotor core.

A bottom surface of the fixing portion may be formed to be longer than a top surface of the fixing portion in the radial direction on the basis of the center of the rotor core, and the fore end of the fixing portion may be formed to tilt.

The fore end of the fixing portion may include a curved surface.

The number of such stoppers may be equal to the number of the protrusion portions.

The number of such stoppers may be equal to the number of the magnets.

The cover may include a plurality of guides which extend downward from the cover body.

The guide may be located between the adjacent magnets.

Another aspect of the present invention provides a rotor including a rotor core, a cover disposed above the rotor core, a magnet disposed on an outer circumferential surface of the rotor core, and a can member which accommodates the rotor core and the magnet and is combined with the cover. Here, the cover includes a plurality of guides extending downward, and the guides are arranged on the outer circumferential surface of the rotor core and arranged inside the can member.

At least one protrusion portion protruding from an edge of the can member and combined with the cover may be included.

The cover may include a cover body and a stopper, and the stopper may include a fixing portion disposed above the protrusion portion combined with the cover in a radial direction from a center of the rotor core.

A fore end of the fixing portion may be located farther out than a fore end of the protrusion portion combined with the cover in the radial direction from the center of the rotor core.

Another aspect of the present invention provides a motor including a rotor including a rotor core, a cover disposed above the rotor core, a magnet disposed on an outer circumferential surface of the rotor core, and a can member which accommodates the rotor core and the magnet and is combined with the cover, wherein the cover includes a plurality of guides extending downward, and the guides are arranged on the outer circumferential surface of the rotor core and arranged inside the can member, a stator disposed outside the rotor, and a rotating shaft combined with the rotor core.

Another aspect of the present invention provides a motor including a rotor including a rotor core, a cover disposed above the rotor core, a magnet disposed on an outer circumferential surface of the rotor core, and a can member which accommodates the rotor core and the magnet and is combined with the cover, wherein the can member includes at least one protrusion portion which protrudes from an edge and is combined with the cover, a stator disposed outside the rotor, and a rotating shaft combined with the rotor core.

Advantageous Effects

According to an embodiment, a protrusion portion formed on an edge of a can is configured to be combined with a cover such that an advantageous effect of excluding use of an adhesive is provided when the can is combined with a rotor core.

According to an embodiment, a stopper is formed on a cover and restricts a protrusion portion of a can such that an advantageous effect of increasing a combinational force between the can and a rotor core is provided.

MODES OF THE INVENTION

Hereinafter, exemplary embodiments of the present invention will be described in detail with reference to the attached drawings. The purpose, particular advantages, and novel features of the present invention will be more clearly understood from the following detailed description and exemplary embodiments related to the attached drawings. Also, the terms used in the specification and the claims should not be limited to general or lexical meanings and should be interpreted as meanings and concepts coinciding with the technical concept of the present invention on the basis of a principle in which the inventor can appropriately define the concept of the terms to describe the invention in the best manner. Also, a detailed description on well-known related art that may unnecessarily obscure the essential of the present invention will be omitted.

Figure 1:
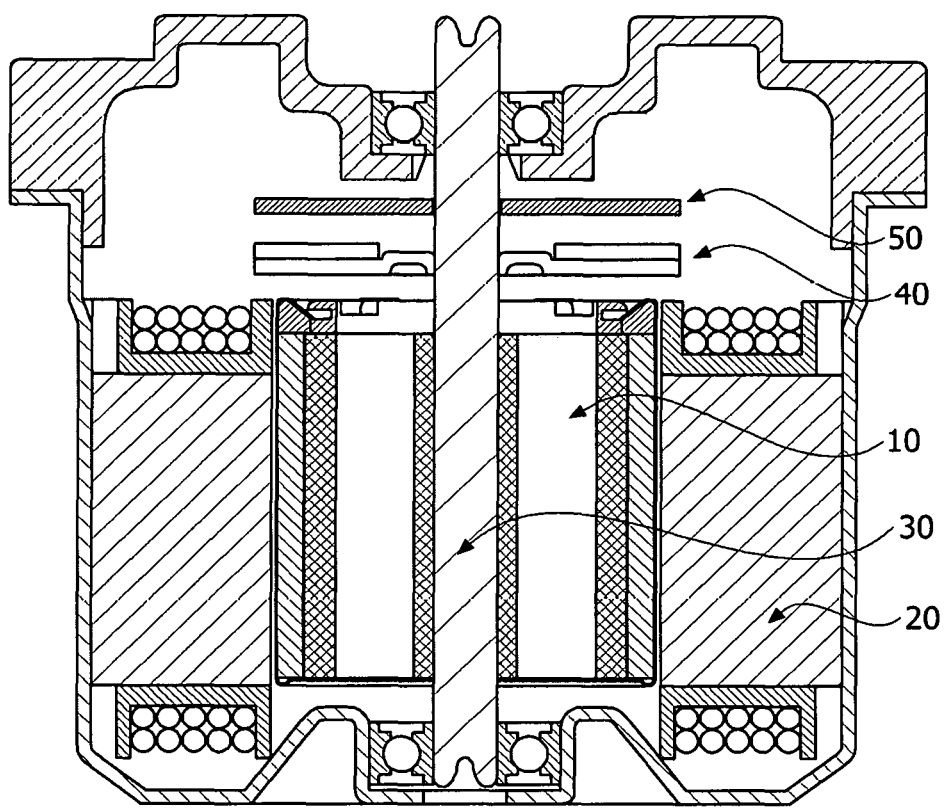
FIG. 1 is a view of a motor according to an embodiment.

FIG. 1 is a view of a motor according to an embodiment.

Referring to FIG. 1, the motor according to the embodiment may include a rotor 10, a stator 20, a rotating shaft 30, and a sensing magnet 40.

The rotor 10 rotates due to an electrical interaction with the stator 20.

A coil is wound on the stator 20 to cause the electrical interaction with the rotor 10. A detailed configuration of the stator 20 with the coil wound thereon is as follows. The stator 20 may include a stator core including a plurality of teeth. The stator core may include an annular yoke portion and the teeth on which the coil is wound from the yoke toward a center. The teeth may be provided at certain intervals along an outer circumferential surface of the yoke portion. Meanwhile, the stator core may be formed by stacking a plurality of plates having a thin steel plate shape. Also, the stator core may be formed by combining and connecting a plurality of divided cores to one another.

An insulator is combined with the teeth of the stator so as to insulate the coil from the stator core to not mutually apply a current.

The rotating shaft 30 may be combined with the rotor 10. When an electromagnetic interaction occurs between the rotor 10 and the stator 20 through supplying a current, the rotor 10 rotates, and the rotating shaft 30 rotates in connection therewith. The rotating shaft 30 may be connected to a steering shaft to transfer power to the steering shaft. The rotating shaft 30 may be supported by a bearing.

The sensing magnet 40 is an apparatus which is combined with the rotating shaft 30 to interwork with the rotor 10 so as to detect a position of the rotor 10. The sensing magnet may include a magnet and a sensing plate. The magnet and the sensing plate may be combined with each other to be coaxial.

A sensor which senses a magnetic force of the sensing magnet may be disposed on a printed circuit board (PCB) 50. Here, the sensor may be a hall integrated chip (IC). The sensor senses changes in N pole and S pole of a main magnet or a sub magnet and generates a sensing signal. The PCB 50 may be combined with a bottom surface of a cover of a housing and may be installed above the sensing magnet such that the sensor faces the sensing magnet.

Meanwhile, the rotor 10 may include a rotor core and a magnet combined with the rotor core. The rotor 10 may have a variety of shapes according to a method of combining the rotor core with the magnet. Among rotors having a variety of shapes, a motor may include, a rotor in which a magnet is combined with an outer circumferential surface of a rotor core. The rotor 10 having this configuration may include an additional can member combined with the rotor core to prevent the magnet from being separated and to increase a combinational force.

Figure 2:
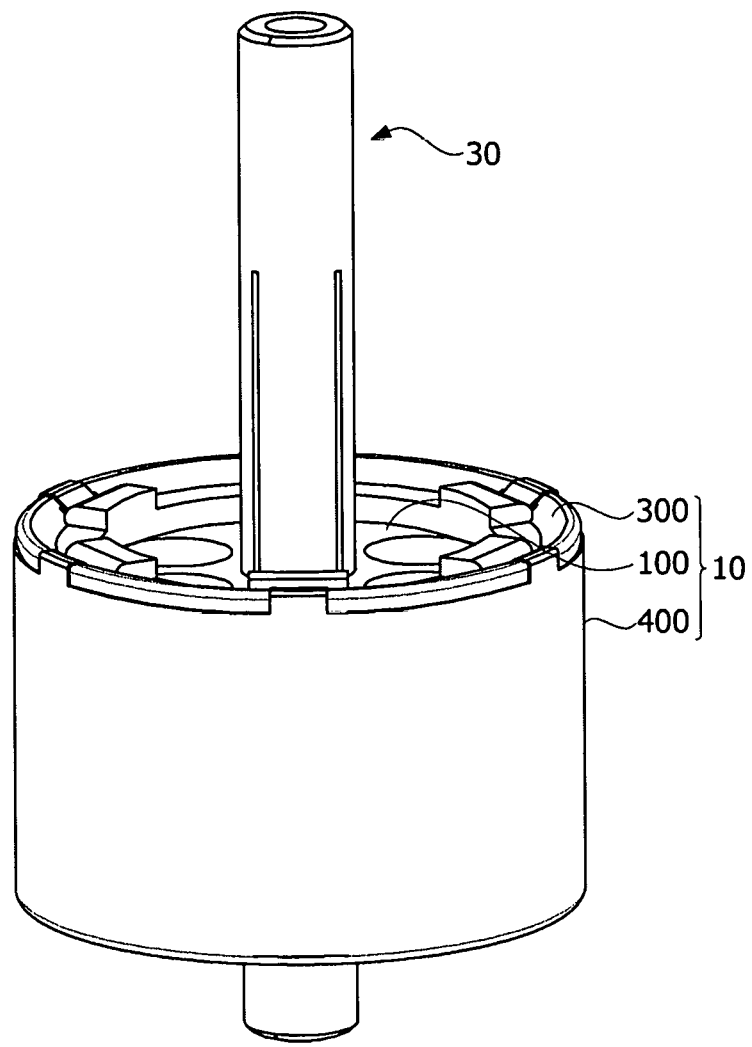
FIG. 2 is a view illustrating a rotor.
Figure 3:
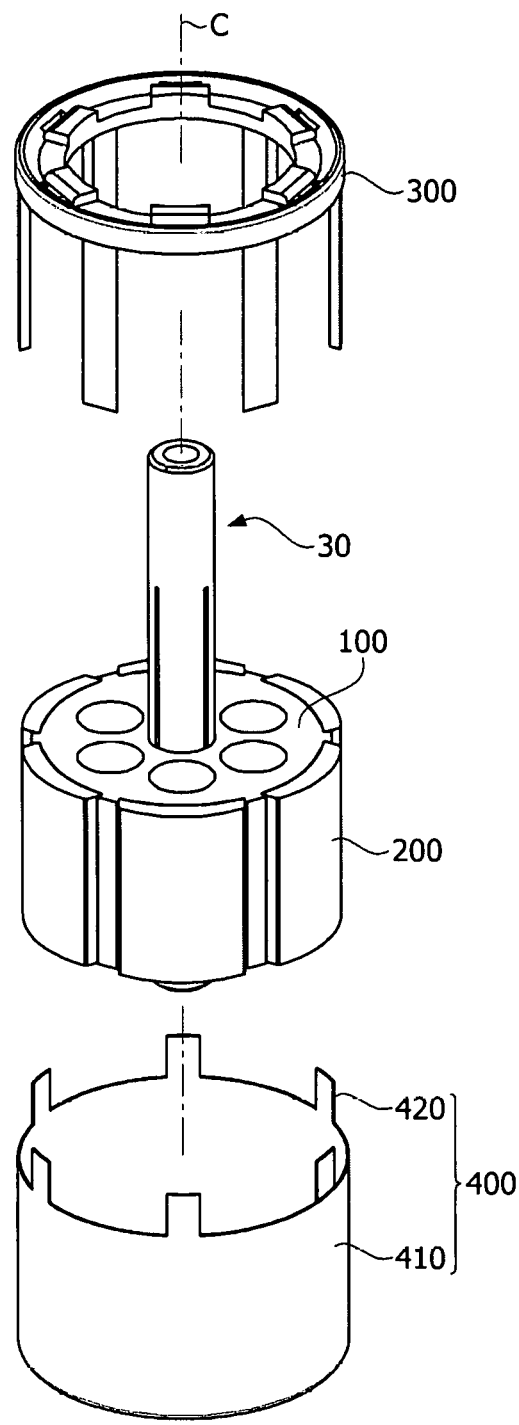
FIG. 3 is an exploded view of the rotor shown in FIG. 2.

FIG. 2 is a view illustrating the rotor, and FIG. 3 is an exploded view of the rotor shown in FIG. 2.

Referring to FIGS. 2 and 3, the rotor 10 may include a rotor core 100, a magnet 200, a cover 300, and a can member 400. In describing the embodiment, it should be noted that a center C of the rotor core 100 is equal to a center C of the can member 400.

The rotor core 100 may be embodied as a shape in which a plurality of plates having a circular thin steel plate shape are stacked or embodied as one cylindrical shape. A hole with which the rotating shaft 30 is combined may be formed in the center of the rotor core 100. A protrusion which guides the magnet 200 may protrude from an outer circumferential surface of the rotor core 100.

The magnet 200 may be attached to the outer circumferential surface of the rotor core 100. A plurality of such magnets 200 may be arranged at certain intervals along a perimeter of the rotor core 100.

The cover 300 may be combined with a top surface or a bottom surface of the rotor core 100. The cover 300 is combined with the can member 400 and fixes the can member 400.

The can member 400 surrounds the magnet 200 so as to fix the magnet 200 not to be separated from the rotor core 100. Also, the can member 400 prevents the magnet 200 from being exposed.

Figure 4:
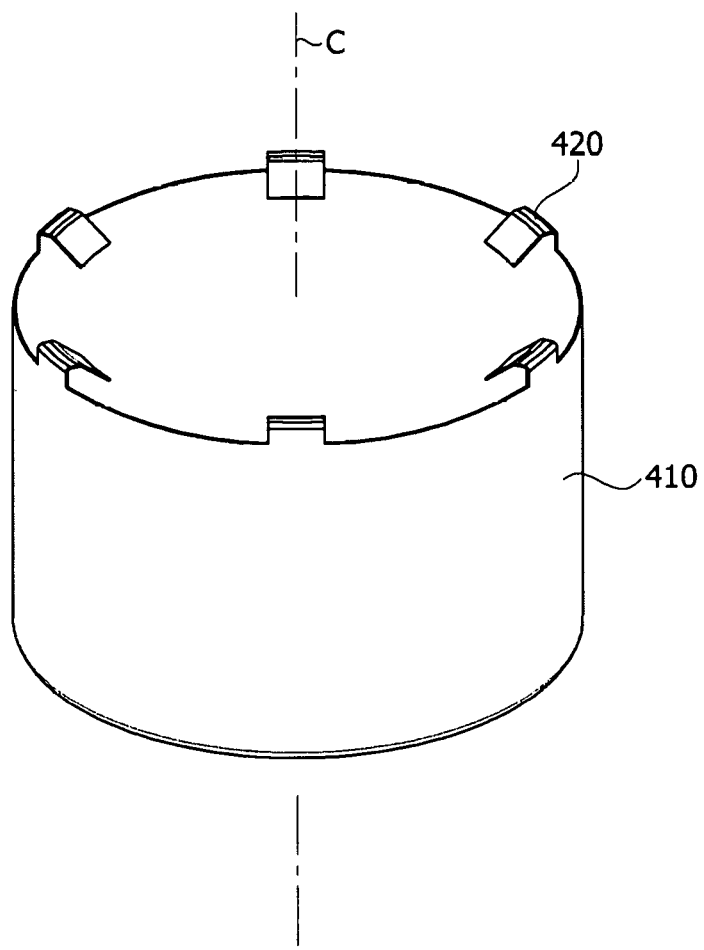
FIG. 4 is a perspective view illustrating a can member.
Figure 5:
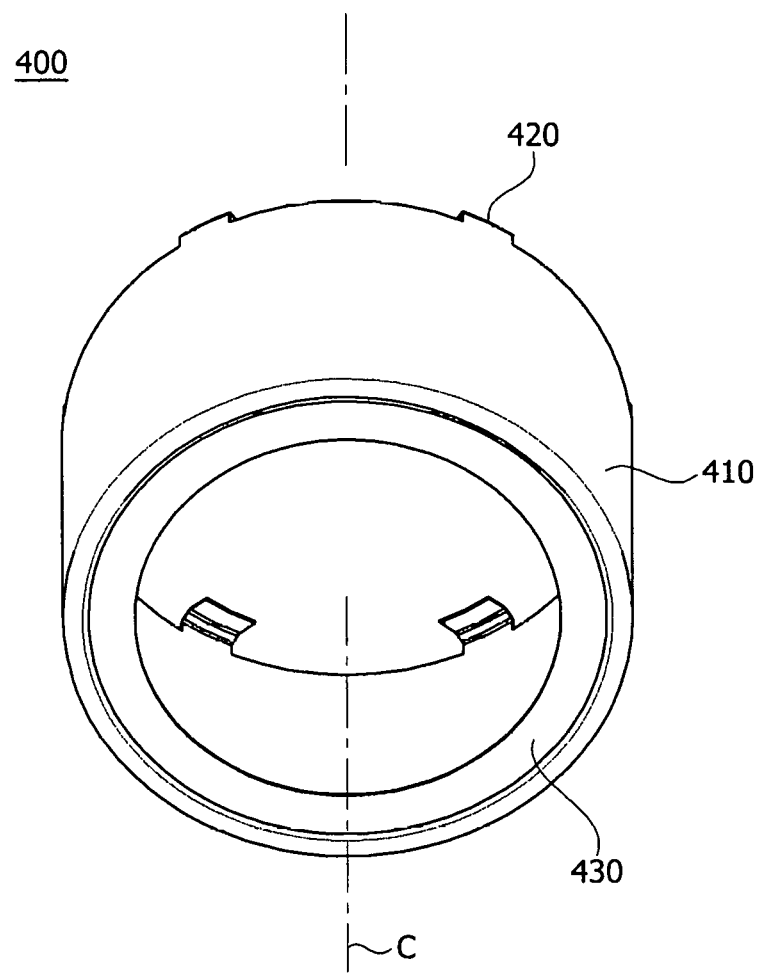
FIG. 5 is a bottom view of the can member shown in FIG. 4.

FIG. 4 is a perspective view illustrating the can member, and FIG. 5 is a bottom view of the can member shown in FIG. 4.

Referring to FIGS. 3 and 5, the can member 400 may include a body 410, a protrusion portion 420, and a flange portion 430. It should be noted in advance that the body 410, the protrusion portion 420, and the flange portion 430 may be described while being classified according to shapes and functional properties thereof but are connected to one another as one means. The can member 400 may be formed of an aluminum material.

The body 410 may have a cylindrical shape. A top and a bottom of the body 410 may be formed in an open state. The rotor core 100 is located in the body 410.

Also, the body 410 surrounds the magnet 200.

The protrusion portion 420 is combined with the cover 300 and fixes the can member 400 to the rotor core 100. The protrusion portion 420 may be formed on an edge of a top end of the body 410. The protrusion portion 420 may be embodied as a sectioned shape formed by extending the body 410. A plurality of such protrusion portions 420 may be provided at certain intervals along the edge of the top end of the body 410. Here, the number of the protrusion portions 420 may be equal to the number of the magnets 200. Also, the protrusion portion 420 may be embodied as a quadrangular section shape. The protrusion portion 420 in a quadrangular shape has high processability and is easily bendable for being combined with the cover 300 so as to be easily assembled.

The flange portion 430 may be formed on an edge of a bottom end of the body 410. In detail, the flange portion 430 may be formed by extending from the edge of the bottom end of the body 410 and being bent toward the center C of the can member 400. The flange portion 430 comes into contact with the bottom surface of the rotor core 100.

Figure 6:
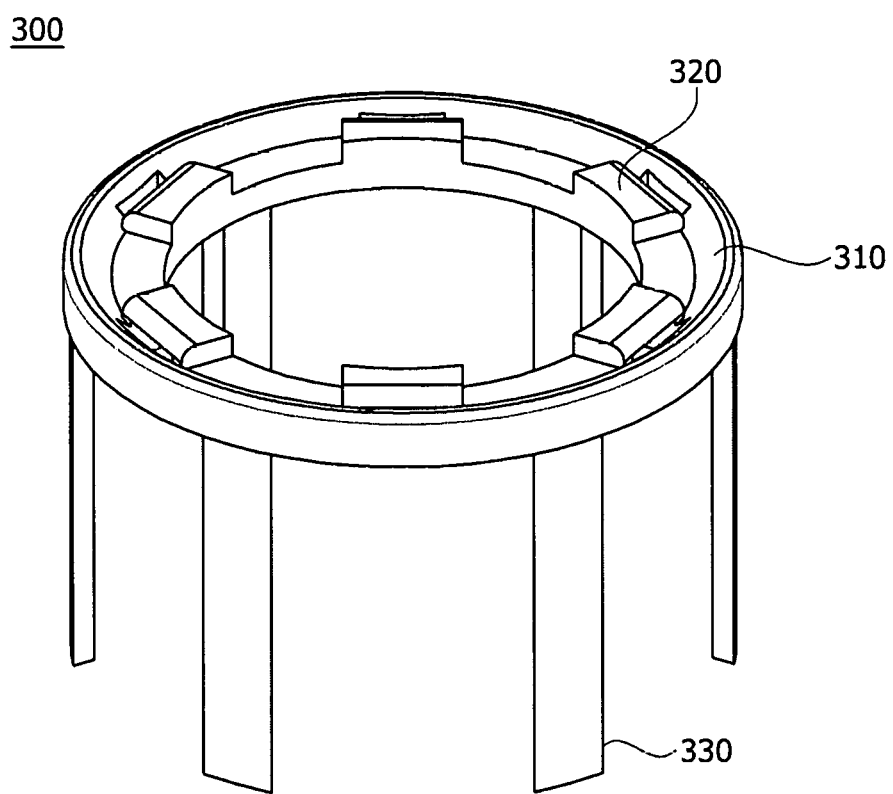
FIG. 6 is a view illustrating a cover.
Figure 7:
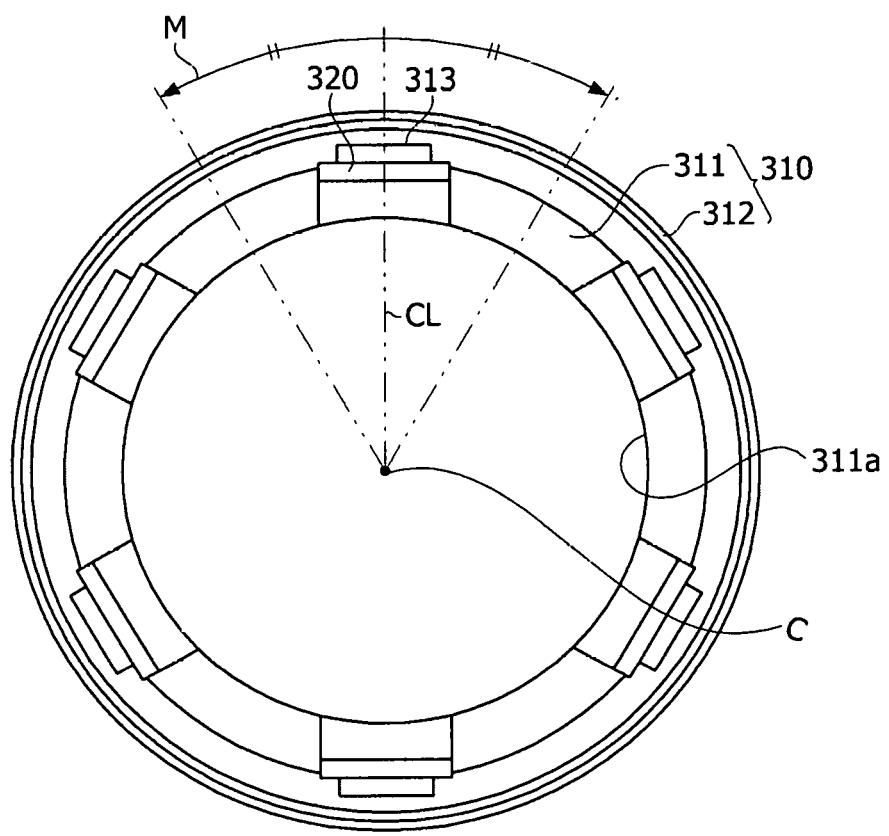
FIG. 7 is a plan view of the cover shown in FIG. 6.

FIG. 6 is a view illustrating the cover, and FIG. 7 is a plan view of the cover shown in FIG. 6.

Referring to FIGS. 6 and 7, the cover 300 is disposed above the rotor core 100. The cover 300 may include a cover body 310, a stopper 320, and a guide 330. The cover body 310, the stopper 320, and the guide 330 may be described while being classified according to shapes and functional properties thereof but are connected to one another as one means.

The cover body 310 may be embodied as an annular plate shape. The cover body 310 may be divided into an inner portion 311 and an outer portion 312. The inner portion 311 is an internal part of the cover body 310 which forms an inner circumferential surface 311a. The outer portion 312 is an external part of the cover body 310 which forms an outer circumferential surface. The stopper 320 may be formed on the inner portion 311. A combinational groove portion 313 which induces combination of the protrusion portion 420 may be formed on the outer portion 312.

A position of the stopper 320 may correspond to a position of the magnet 200. When an area such as M of FIG. 7 is referred to as a position area to which the magnet 200 is attached in a circumferential direction on the basis of the center C, the stopper 320 may be located in a central part of an area shown as M of FIG. 7.

In detail, the stopper 320 is provided such that a reference line CL passes a center of M of FIG. 7 and the center C on the basis of the circumferential direction. Since a combinational force between the magnet 200 and the can member 400 may be weak near the center of the magnet 200 on the basis of the circumferential direction, the stopper 320 is disposed around the center of the magnet 200 so as to increase the combinational force of the can member 400.

Meanwhile, the number of the stoppers 320 may be equal to the number of the magnets 200.

Figure 8:
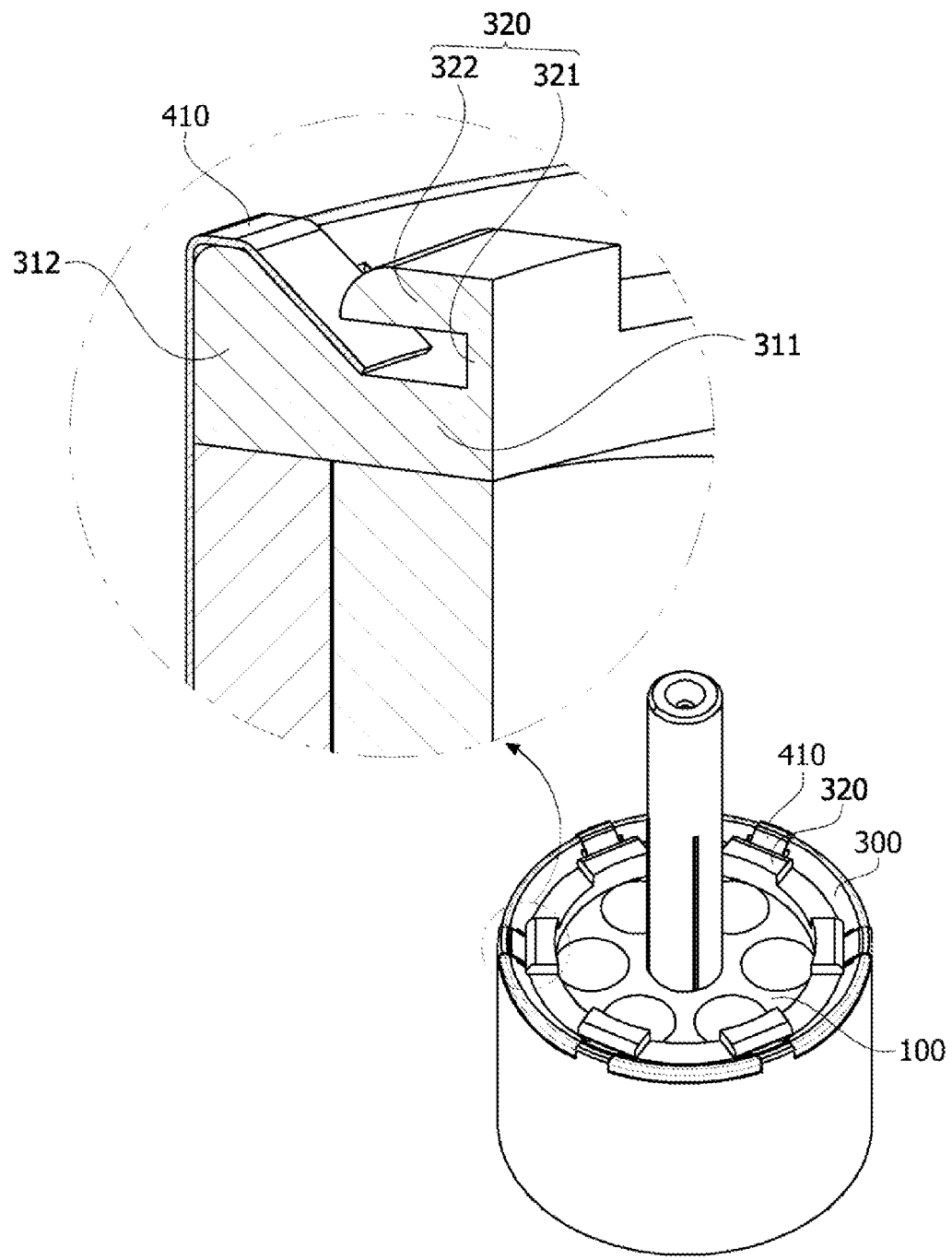
FIG. 8 is a view illustrating a protrusion portion and a stopper.
Figure 9:
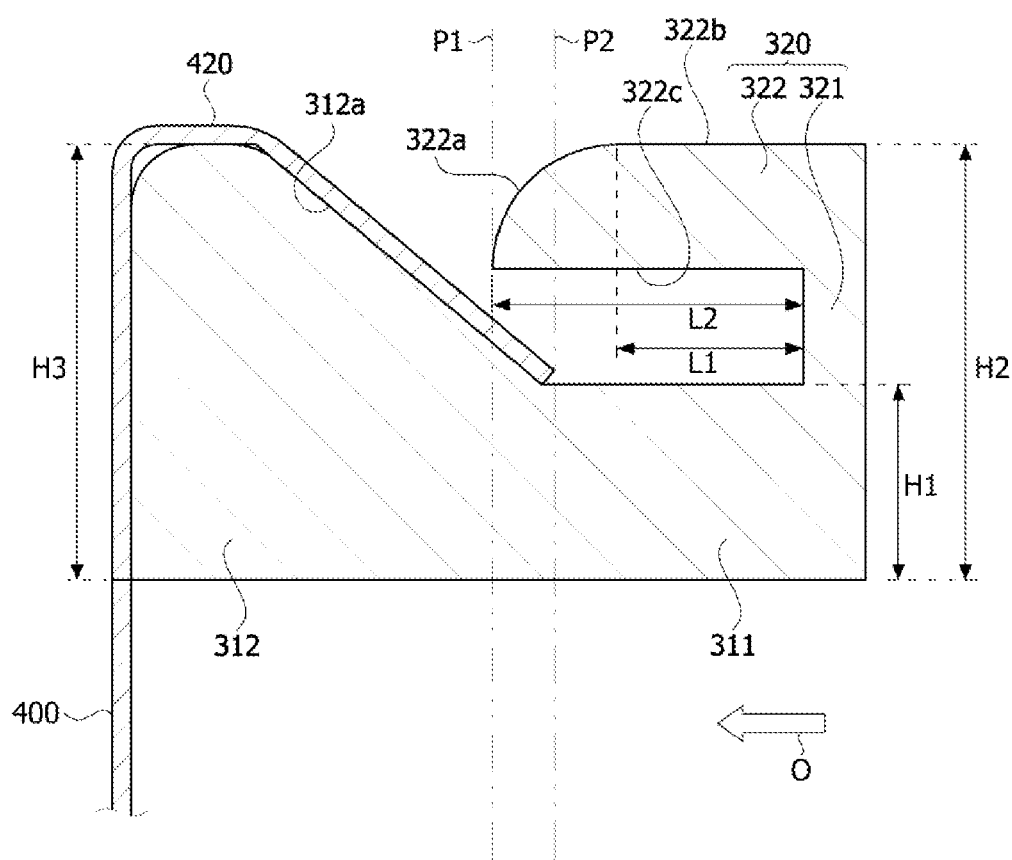
FIG. 9 is a cross-sectional view illustrating the stopper.

FIG. 8 is a view illustrating the protrusion portion and the stopper, and FIG. 9 is a cross-sectional view illustrating the stopper.

Referring to FIGS. 8 and 9, the outer portion 312 may be formed to be higher than the inner portion 311. That is, when an axial direction of the rotor core 100 is a height direction, a top surface of the outer portion 312 may be formed to be higher than a top surface of the inner portion 311.

A height H1 of the inner portion 311 of the cover body 310 may be formed to be lower than a height H2 of the outer portion 312. The top surface of the inner portion 311 may be formed to be a flat plane shape. On the other hand, the top surface of the outer portion 312 may include an inclined surface 312a. The inclined surface 312a of the outer portion 312 may be formed to be inclined toward a center of the rotor core 100. An outside of the outer portion 312 forms a step portion on which the protrusion portion 420 moves, and an inside of the outer portion 312 is configured to be connected to the inner portion 311 through the inclined surface 312a.

The protrusion portion 420 of the can member 400 may be formed to be bent along the outer portion 312 and be combined with the cover 300.

The stopper 320 physically restricts the protrusion portion 420 combined with the cover 300 from being separated therefrom.

The stopper 320 may include a column portion 321 and a fixing portion 322. The column portion 321 protrudes from a top surface of the inner portion 311 of the cover 300. The column portion 321 may be formed to be vertical to the top surface of the inner portion 311. The fixing portion 322 may be formed to extend horizontally from a fore end of the column portion 321. The fixing portion 322 is disposed while being spaced apart from a top surface of the cover 300.

A length L2 of a bottom surface 322c of the fixing portion 322 may be formed to be longer than a length L1 of a top surface 322b of the fixing portion 322. Here, when a direction indicated by an arrow O of FIG. 9 is an outward direction, a position P1 of a fore end of the fixing portion 322 is located farther out than a position P2 of a fore end of the protrusion portion 420 on the basis of a radial direction of the cover 300. This is to restrict the protrusion portion 420 from being completely separated from the rotor core 100 when the protrusion portion 420 is spaced apart from the cover 300.

The fore end of the fixing portion 322 may be formed to tilt. This is to induce an end of the protrusion portion 420 to slide on the fore end of the fixing portion 322 and be located below the fixing portion 322. Here, the fore end of the fixing portion 322 includes a curved surface so as to induce the protrusion portion 420 to more easily slide and move on the fore end of the fixing portion 322.

As described above, in the rotor according to the embodiment, the protrusion portion 420 of the can member 400 is directly physically combined with the cover 300 so as to exclude use of an additional adhesive for combining the can member 400.

Figure 10:
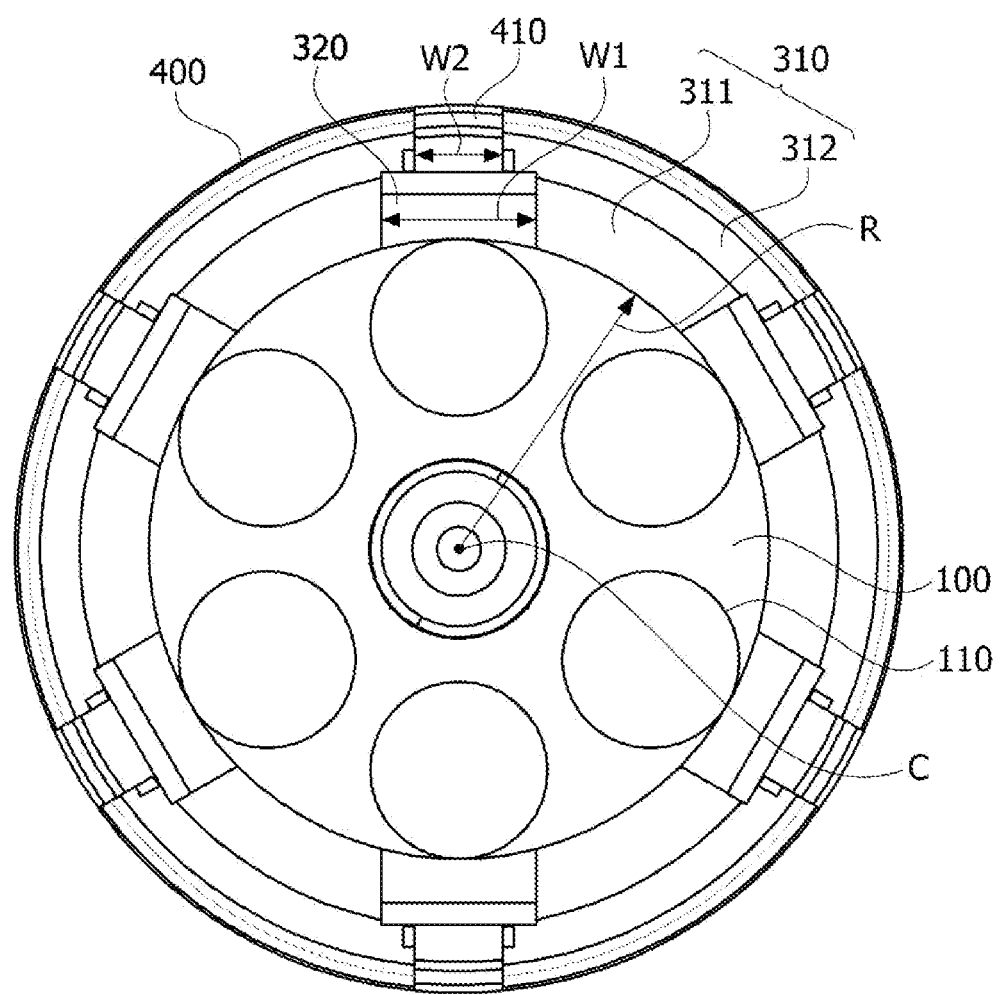
FIG. 10 is a view illustrating a size of the cover and a size of the stopper.

FIG. 10 is a view illustrating a size of the cover and a size of the stopper.

Referring to FIG. 10, the cover 300 may be formed such that an inner radius R does not cover a hole 110 of the rotor core 100. Also, a width W1 of the stopper 320 may be formed to be greater than a width W2 of the protrusion portion 420. To stably prevent the protrusion portion 420 from being separated, it is necessary that the width W1 of the stopper 320 is greater than the width W2 of the protrusion portion 420.

Figure 11:
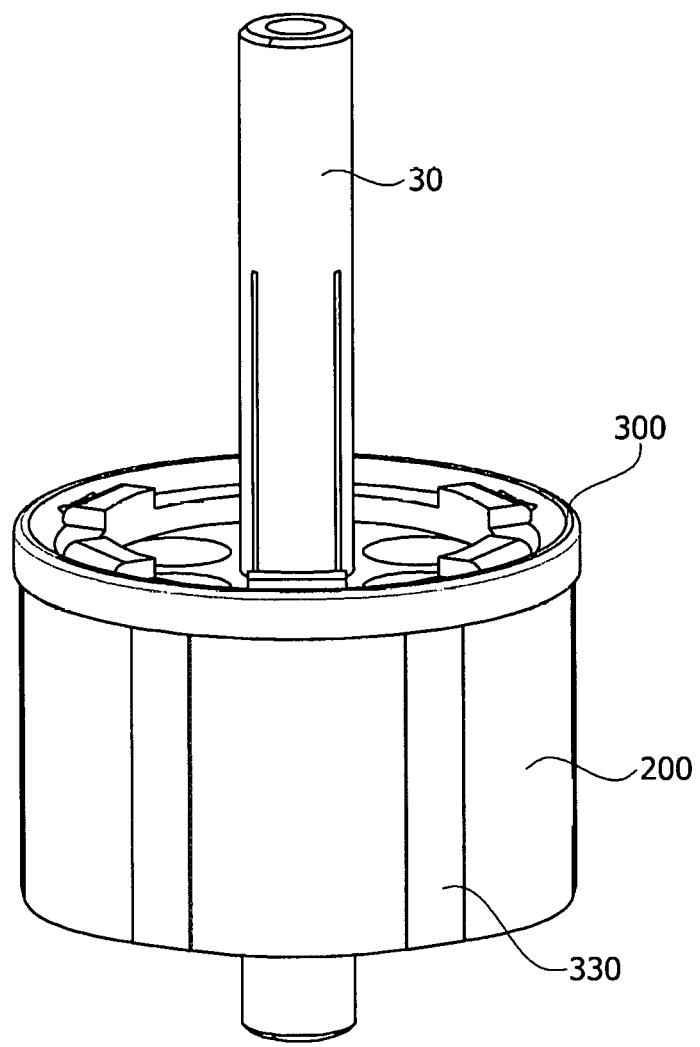
FIG. 11 is a view illustrating a state of the rotor assembled with the cover.
Figure 12:
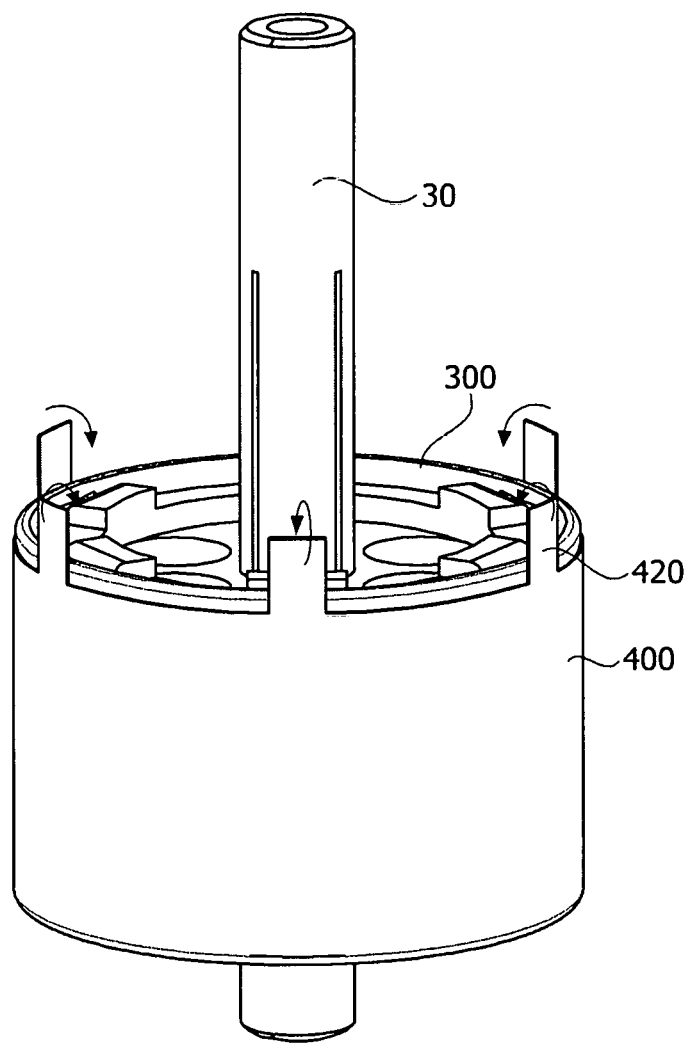
FIG. 12 is a view illustrating the can member installed above a magnet.

FIG. 11 is a view illustrating a state of the rotor assembled with the cover, and FIG. 12 is a view illustrating the can member installed above the magnet.

Referring to FIG. 11, the guide 330 of the cover 300 may be inserted between the magnets 200 which are adjacent to each other. Afterwards, as shown in FIG. 12, the can member 400 is mounted while the cover 300 is inserted. Afterwards, the protrusion portion 420 is bent and fixed to the cover 300.

As described above, the rotor and the motor including the same according to one exemplary embodiment of the present invention have been described in detail with reference to the attached drawings.

The above description is merely for exemplarily describing the technical concept of the present invention, and a variety of modifications, changes, and replacements thereof may be made by one of ordinary skill in the art without departing from the essential features of the present invention. Accordingly, the embodiments disclosed herein and the attached drawings are not intended to limit and merely explain the technical concept of the present invention, and the scope of the present invention should not be limited by the above embodiment and the attached drawings. The scope of the present invention should be interpreted by the following claims and all technical concepts within the equivalent scope thereof should be interpreted as being included in the scope of the present invention.

The invention claimed is:

1. A rotor comprising:
a rotor core;
a cover disposed above the rotor core;
a magnet disposed on an outer circumferential surface of the rotor core; and
a can member which accommodates the rotor core and the magnet and is combined with the cover,
wherein the cover comprises a plurality of guides extending downward,
wherein the plurality of guides are arranged on the outer circumferential surface of the rotor core and arranged inside the can member,
wherein the cover comprises a cover body including an annular inner portion and an outer portion formed outside the inner portion,
wherein the outer portion is formed to be higher than the inner portion based on an axial direction of the rotor core, and
wherein the can member includes:
a cylindrical body surrounding the magnet, the cylindrical body having a first end and a second end located opposite to the first end; and
at least one protrusion portion which protrudes from the first end of the cylindrical body and which is configured to be combined with the cover.

2. The rotor of claim 1, wherein the can member further comprises a flange portion which is formed at the second end of the cylindrical body and internally faces a center of the can member.

3. The rotor of claim 1, wherein the protrusion portion is located in a center of the magnet based on a circumferential direction of the rotor core.

4. The rotor of claim 1, wherein a number of protrusion portions is equal to a number of magnets.

5. The rotor of claim 1, wherein the protrusion portion is combined with the outer portion.

6. The rotor of claim 5, wherein the outer portion comprises an inclined surface formed to be gradually inclined toward a center of the rotor core.

7. The rotor of claim 6, wherein the outer portion comprises a combinational groove portion which is formed to be concave and with which the protrusion portion is combined.

8. The rotor of claim 1, wherein the cover comprises the plurality of guides which extend downward from the cover body.

9. The rotor of claim 1, wherein the cover includes the cover body and a stopper, and
wherein the stopper comprises a fixing portion disposed above the protrusion portion combined with the cover in a radial direction from a center of the rotor core.

10. The rotor of claim 9, wherein a fore end of the fixing portion is located farther out than a fore end of the protrusion portion combined with the cover in the radial direction from the center of the rotor core.

11. The rotor of claim 1, wherein the protrusion portion is formed as a sectioned shape by extending the cylindrical body.

12. The rotor of claim 1, A rotor comprising:
a rotor core;
a cover disposed above the rotor core;
a magnet disposed on an outer circumferential surface of the rotor core; and
a can member which accommodates the rotor core and the magnet and is combined with the cover,
wherein the cover comprises a plurality of guides extending downward,
wherein the plurality of guides are arranged on the outer circumferential surface of the rotor core and arranged inside the can member,
wherein the can member comprises at least one protrusion portion which protrudes from an edge and is configured to be combined with the cover,
wherein the cover comprises a cover body including an annular inner portion and an outer portion formed outside the inner portion,
wherein the outer portion is formed to be higher than the inner portion based on an axial direction of the rotor core,
wherein the cover comprises a stopper including a protruding column portion and a fixing portion extending from the column portion, and
wherein the fixing portion is disposed above the protrusion portion combined with the cover in a radial direction from a center of the rotor core.

13. The rotor of claim 12, wherein the column portion protrudes from a top surface of the inner portion, and a fore end of the fixing portion is located farther out than a fore end of the protrusion portion combined with the cover in the radial direction from the center of the rotor core.

14. The rotor of claim 13, wherein a bottom surface of the fixing portion is formed to be longer than a top surface of the fixing portion in the radial direction based on the center of the rotor core, and
wherein the fore end of the fixing portion is formed to tilt.

15. The rotor of claim 14, wherein the fore end of the fixing portion comprises a curved surface.

16. The rotor of claim 15, wherein a number of stoppers is equal to a number of magnets.

17. The rotor of claim 16, wherein a guide is located between adjacent magnets.

18. The rotor of claim 12, wherein a number of stoppers is equal to a number of protrusion portions.

19. The rotor of claim 12, wherein a width of the stopper if formed to be greater than a width of the protrusion portion.

20. A motor comprising:
a stator;
a rotor disposed inside the stator;
a shaft couple to the rotor;
wherein the rotor comprises:
a rotor core;
a cover disposed above the rotor core;
a magnet disposed on an outer circumferential surface of the rotor core; and
a can member which accommodates the rotor core and the magnet and is combined with the cover,
wherein the cover comprises a plurality of guides extending downward,
wherein the plurality of guides are arranged on the outer circumferential surface of the rotor core and arranged inside the can member,
wherein the cover comprises a cover body including an annular inner portion and an outer portion formed outside the inner portion,
wherein the outer portion is formed to be higher than the inner portion based on an axial direction of the rotor, and
wherein the can member includes:
a cylindrical body surrounding the magnet, the cylindrical body having a first end and a second end located opposite to the first end; and
at least one protrusion portion which protrudes from the first end of the cylindrical body and which is configured to be combined with the cover.

* * * * *